United States Patent [19]

Buels

[11] Patent Number: 4,471,612
[45] Date of Patent: Sep. 18, 1984

[54] WIND-SOLAR POWERED WATER CONDENSING AND POWER GENERATING SYSTEM

[76] Inventor: Jesse H. Buels, Rte. 1, Box 46, Beasley, Tex. 77417

[21] Appl. No.: 386,211

[22] Filed: Jun. 7, 1982

[51] Int. Cl.³ .......................... F03D 3/02; F03D 7/06
[52] U.S. Cl. .................................... 60/398; 60/641.8; 60/641.12; 415/DIG. 8
[58] Field of Search ................. 60/398, 641.8, 641.12; 290/44, 55; 415/2 A, 3 A, 4 A, DIG. 8

[56] References Cited

FOREIGN PATENT DOCUMENTS 3185 7/1979 European Pat. Off. ............ 415/2 A
7705793 11/1978 Netherlands ....................... 415/2 A

*Primary Examiner*—Robert E. Garrett
*Assistant Examiner*—John M. Husar
*Attorney, Agent, or Firm*—Harvey B. Jacobson

[57] ABSTRACT

A pair of slightly vertically spaced and inclined large diameter tubular members extend between and open into a pair of plenum structures mounted on elevated portions of horizontally spaced apart natural or man-made structures between which natural wind currents flow at greater than average speeds. The lower air plenum structure includes an air inlet which opens into the wind and the upper air plenum structure includes an upwardly opening air outlet as well as power generating air turbine structure therein. The downwind sides of the large diameter tubes converge toward each other and a small diameter tube extends along the large diameter tubes on the downwind side thereof and is only slightly spaced from the external surfaces from the large diameter tubes. The lower end of the small diameter tube includes means for receiving air therein while the upper end includes means for discharging air therefrom into the higher air plenum structure. As the prevailing wind impacts against the windward side of the large diameter tubes, it is slightly compressed and moves through the narrow area defined between the large tubes with which the small diameter tube is registered. As the wind exits from the leaward side of the narrow area, the air thereof expands and absorbs heat from the small diameter pipe and causes moisture within the air flowing through the small tube to condense on the inner surfaces thereof and flow toward a drain at the lower end of the small tube.

13 Claims, 14 Drawing Figures

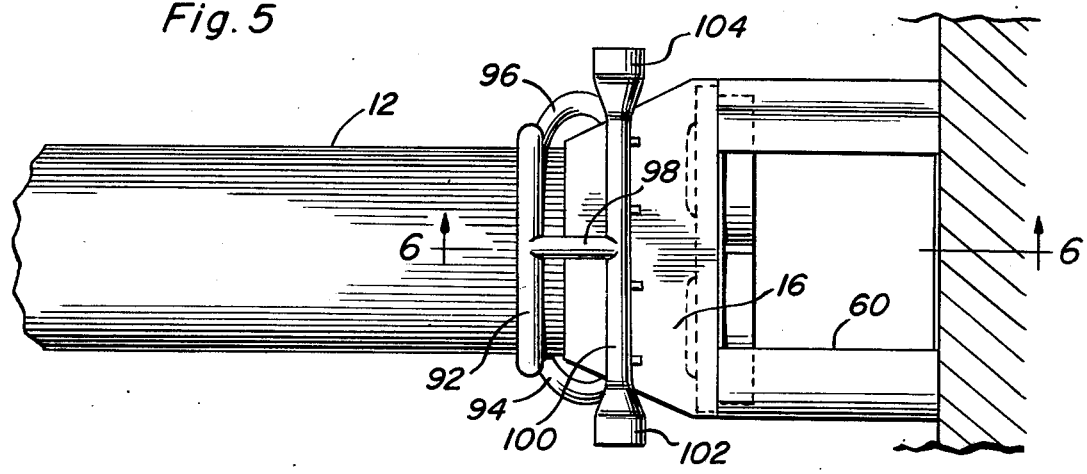
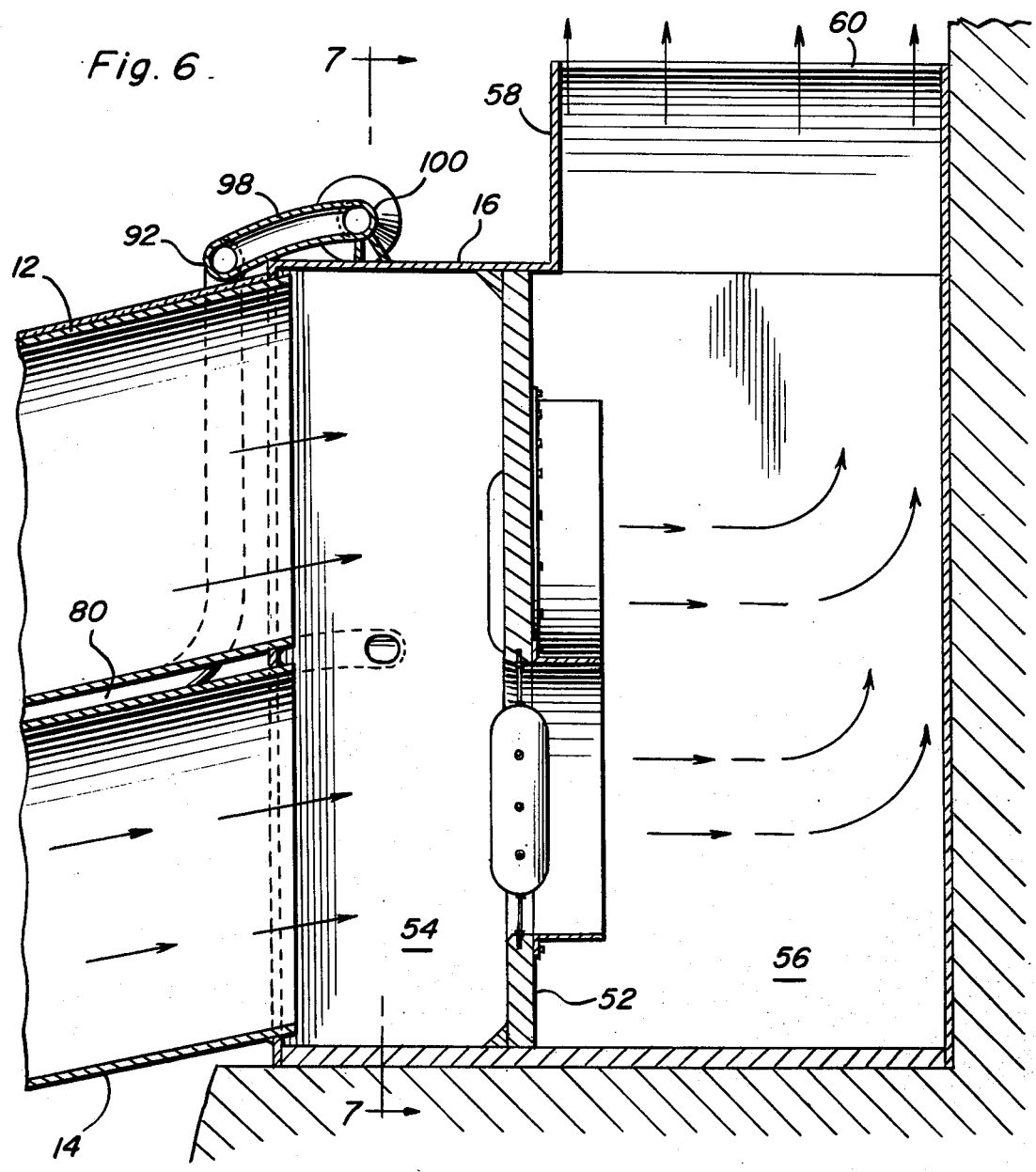

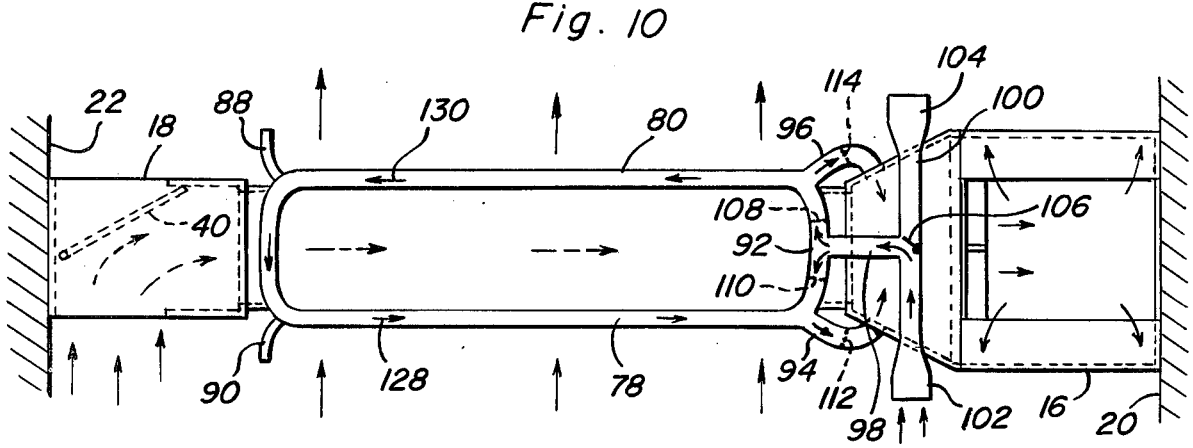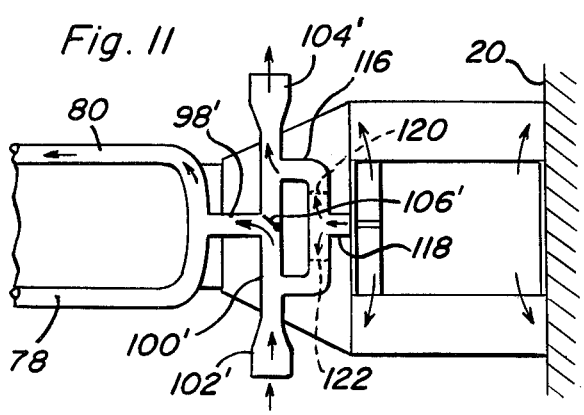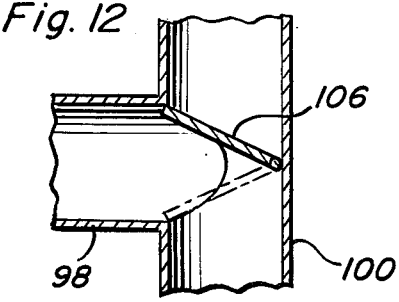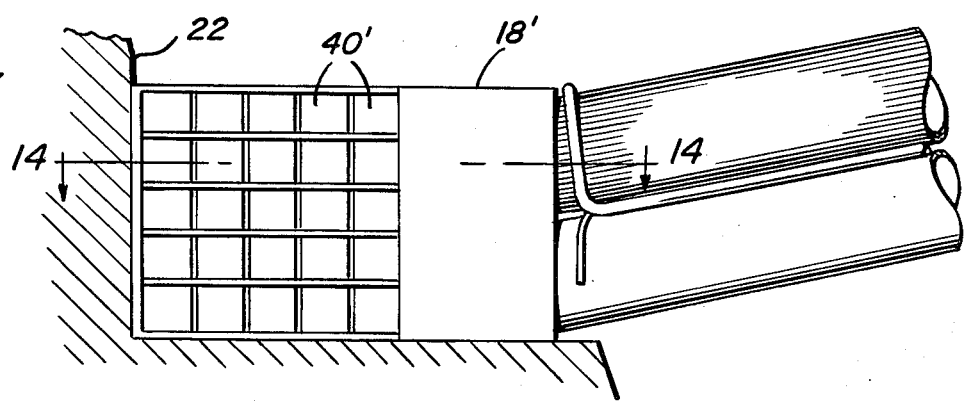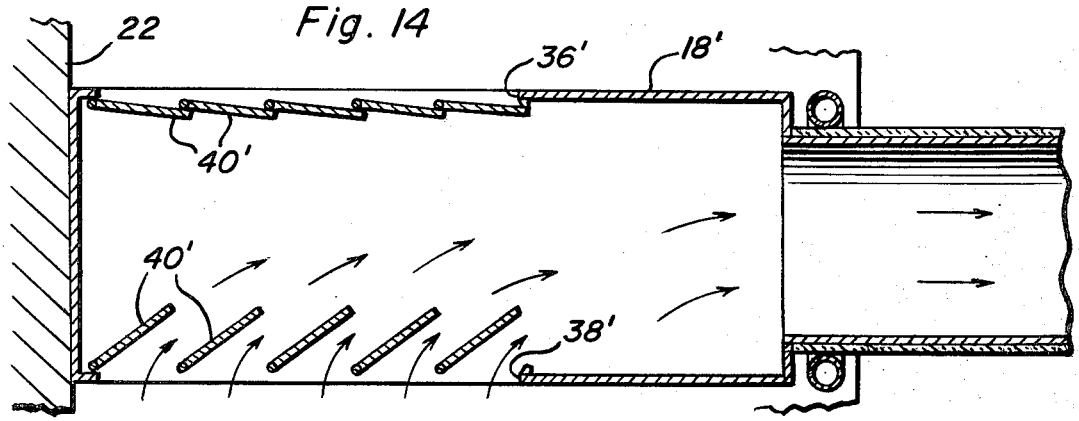

WIND-SOLAR POWERED WATER CONDENSING AND POWER GENERATING SYSTEM

BACKGROUND OF THE INVENTION

In many remote areas there is a need for power to be generated through the use of natural power which may be readily harnessed as well as a need for potable water.

Although solar and wind energy comprise two sources of natural energy which may be readily harnessed, solar energy is available in sufficient magnitude only a small fraction of a day and may be not available for several days due to clouds. Further, wind energy is available substantially continuously only in a relatively few localities.

Inasmuch as little can be done to increase the hours during a day that solar energy may be collected and little may be done to increase the velocity or duration of a wind, some means is needed whereby available solar and wind energy may be harnessed at the same time and by the same structure in order that the power output developed will be more constant and reliable than a similar power output developed solely as a result of solar energy or solely as a result of wind energy.

In addition, a need exists for a usable energy developer which will also be capable of providing a reasonable supply of potable water in an otherwise reasonably dry area.

Examples of various previously known structures for harnessing solar and wind power and for condensing available water are disclosed in U.S. Pat. Nos. 3,095,923, 3,304,696, 3,436,908, 4,206,396, 4,208,873 and 4,224,528.

BRIEF DESCRIPTION OF THE INVENTION

The power generating system of the instant invention is constructed in a manner whereby the wind incident thereon may be accelerated, whereby the solar energy thereon will effect still further acceleration of the wind to be harnessed and whereby the wind incident on the system will cool a predetermined portion of the system for condensing water therein.

The main object of this invention is to provide an apparatus for generating power and for generating power as a result of the harnessing of wind and solar energy.

Another object of this invention is to provide a system constructed in a manner whereby the velocity of the wind incident thereon will be effectively increased by channeling of the wind and by the collection of solar heat.

Still another object of this invention is to provide a system capable of condensing reasonably large quantities of potable water and whose capacity for condensing water will automatically increase as the quantity of wind harnessed by the system increases.

Another very important object of this invention is to provide a power generating system of the wind and solar energy collecting type and which may be utilized in either natural or man-made environments of a type specifically adapted for efficient operation of the power generating system.

A final object of this invention to be specifically enumerated herein is to provide a power generating system in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a top plan view of the elevated end portion of the power generating system;

FIG. 6 is an enlarged fragmentary vertical sectional view taken substantially upon the plane indicated by the section line 6—6 of FIG. 5;

FIG. 10 is a schematic top plan view of the system illustrating the flow of air through the water condensing portion thereof;

FIG. 11 is an enlarged fragmentary top plan view of the right hand portion of FIG. 10;

FIG. 12 is a fragmentary enlarged horizontal sectional view of the central valve structure of FIG. 11;

FIG. 13 is a fragmentary side elevational view of a modified form of air inlet plenum; and FIG. 14 is an enlarged fragmentary horizontal sectional view taken substantially upon the plane indicated by the section line 14—14 of FIG. 13.

DETAILED DESCRIPTION OF THE INVENTION

Figure 1:
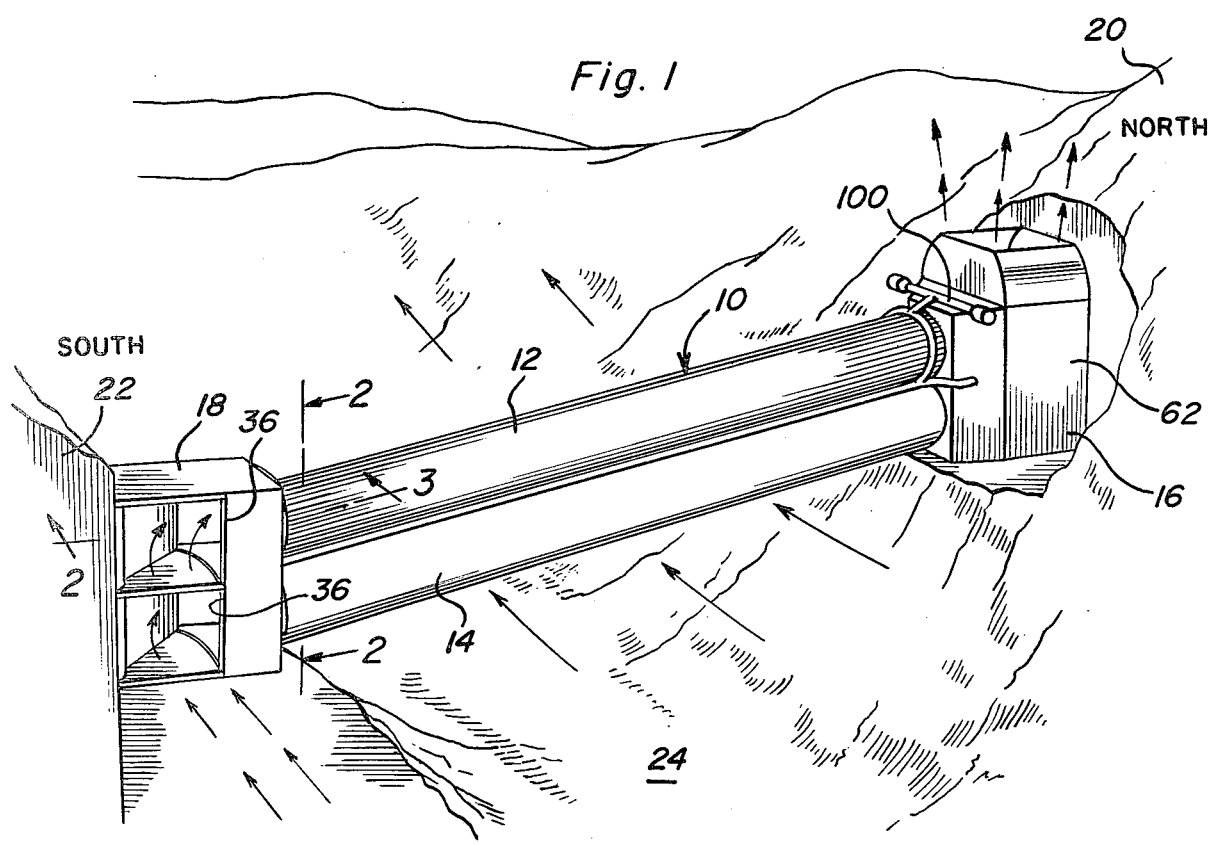
FIG. 1 is a perspective view of a typical installation of the power generating and water condensing system of the instant invention.

Referring now more specifically to the drawings, the numeral 10 generally designates the water condensing and power generating system of the instant invention. The system 10 includes a pair of large diameter upper and lower tubes 12 and 14 disposed in parallel, generally horizontal slightly spaced superposed relation. The tubes are slightly upwardly inclined toward one pair of corresponding ends thereof which open into an outlet plenum assembly 16, the lower ends of the tubes opening into an inlet plenum assembly 18.

The plenum assemblies are stationarily mounted on a pair of horizontally spaced apart valley walls or hills 20 and 22 between which a natural channel 24 is provided for funneling the wind in order to increase the velocity thereof. It is to be noted that the opposite walls or hills 20 and 22 could be man-made structures rather than natural structures and it is to be noted that the outlet plenum assembly 16 is disposed to the north of the inlet plenum assembly 18.

Figure 9:
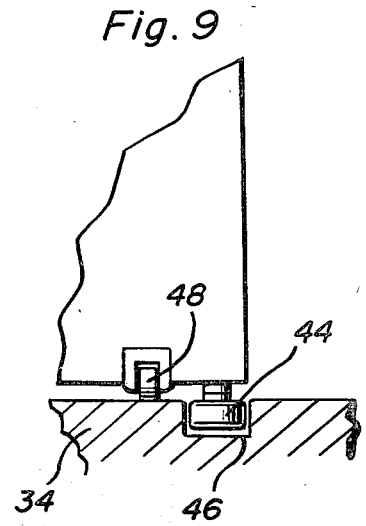
FIG. 9 is a fragmentary elevational view illustrating the manner in which the free swinging marginal edge portion of the swingable damper plate of FIG. 4 is guidingly supported from the associated plenum structure.
Figure 3:
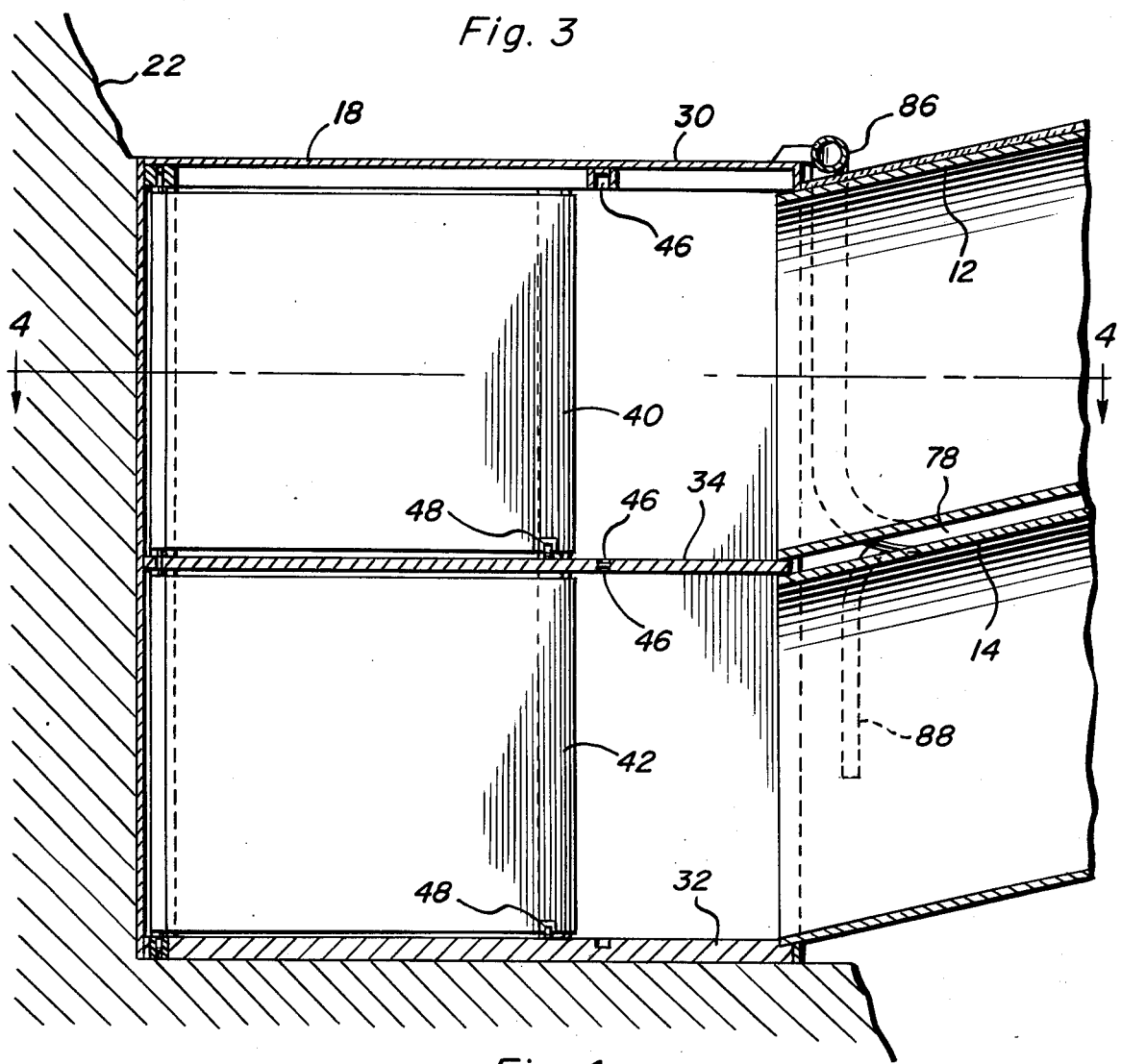
FIG. 3 is an enlarged fragmentary vertical sectional view taken substantially upon the plane indicated by the section line 3—3 of FIG. 1.

The inlet plenum assembly, see FIGS. 1 through 4, includes opposite sides 26 and 28 facing to the west and east, respectively, and top and bottom walls 30 and 32 as well as an intermediate height horizontal partition 34 above and below which the tubes 12 and 14 open into the inlet plenum assembly 18. Each of the walls 26 and 28 has a pair of upper and lower openings 36 and 38 formed therein and a pair of upper and lower damper panels 40 and 42 are mounted within the plenum assembly 18 above and below the partition 34 for oscillation about upstanding axes for movement between first positions, such as that illustrated in solid lines in FIG. 4, and second positions, such as that illustrated in phantom lines in FIG. 4. When in the solid line positions, the damper plates 40 admit air into the inlet plenum assembly 18 from the east whereby an east wind is funneled into the plenum assembly 18 and directed into the lower inlet ends of the tubes 12 and 14. The damper plates 40 and 42 are freely pivoted and the free swinging ends of the upper and lower marginal edges of each include rollers 44, see FIGS. 3, 4 and 9, guidingly received in arcuate grooves 46 defined by the under and upper surfaces of the top and bottom walls 32 and the top and under surfaces of the partition 34. In addition, the free swinging end of the lower marginal edge of each damper plate 40 includes a support roller 48 and the rollers 48 of the damper plates 40 and 42 are rollingly engaged with the upper surfaces of the partition 34 and bottom wall 32.

Figure 4:
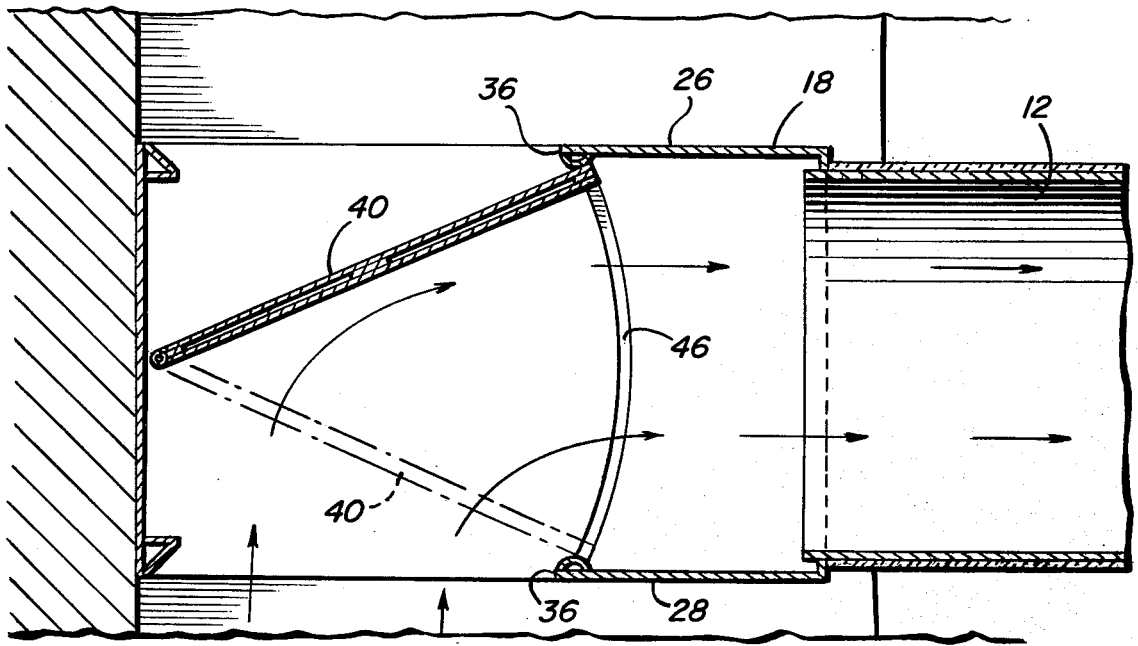
FIG. 4 is a fragmentary horizontal sectional view taken substantially upon the plane indicated by the section line 4—4 of FIG. 3.

When the wind blows from the east, the damper plates 40 and 42 swing to the solid line position thereof illustrated in FIG. 4 and if the wind blows from the west, the damper plates 40 swing to the phantom line positions thereof illustrated in FIG. 4.

Alternately, with attention now invited more specifically to FIG. 14, a modified form of inlet plenum assembly 18' includes opposite side openings 36' and 38' and each opening 36' and 38' has a plurality of vertically spaced sets of pivotally mounted shutter plates 40' operatively associated therewith, the shutter plates 40' being oscillatable only approximately 45° relative to the inlet plenum assembly 18' between the closed positions of the shutter plates operatively associated with the opening 36' and the open positions of the shutter plates 40' operatively associated with the opening 38'. Of course, it will be noted that the shutter plates 40' function in substantially the same manner as the damper plates 40 and 42. Further, if the shutter plates 40' are used rather than the damper plates 40 and 42, the equivalent of the partition 34 may be omitted from the interior of the intake plenum assembly 18.

Figure 7:
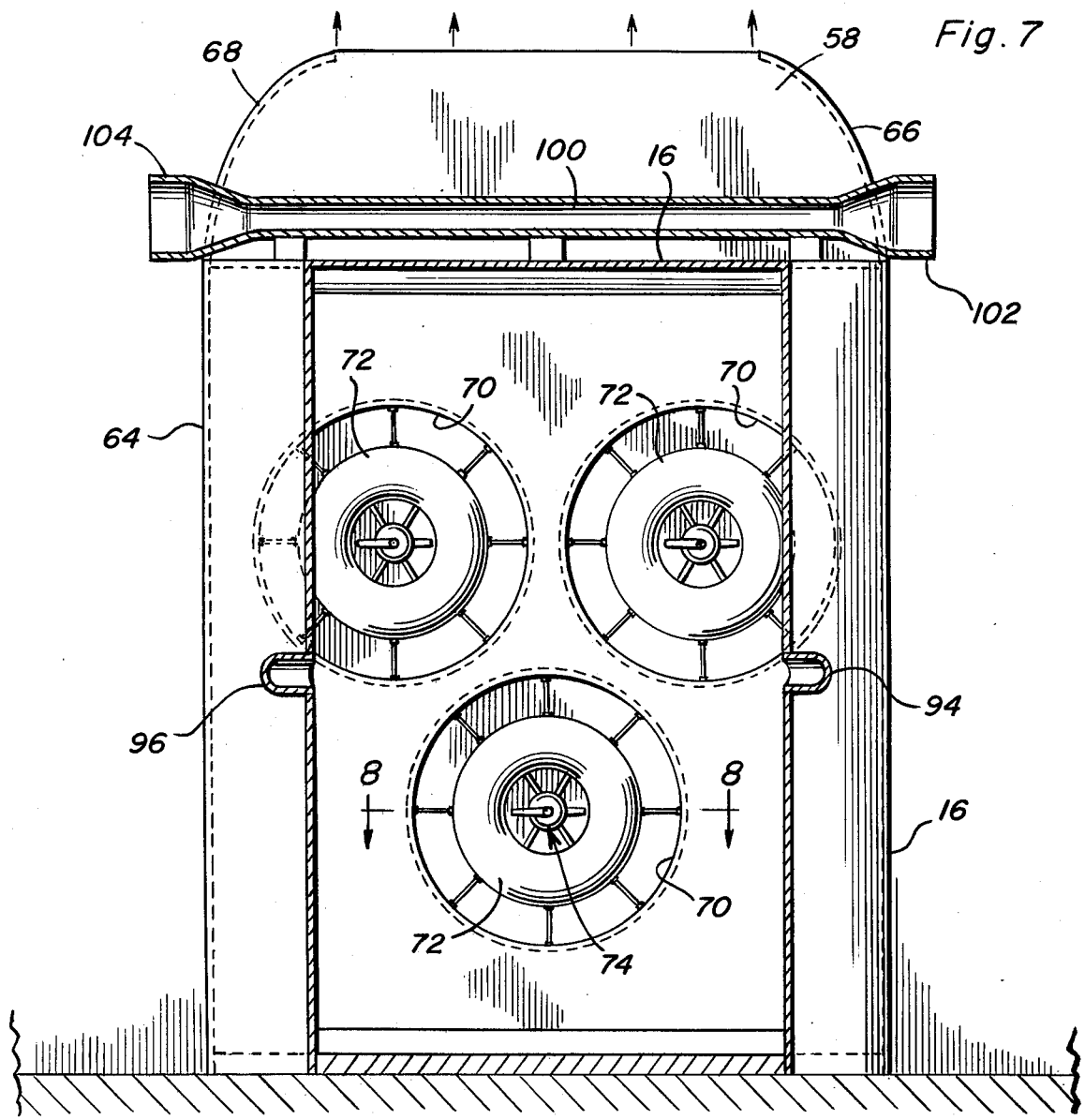
FIG. 7 is a vertical sectional view taken substantially upon the plane indicated by the section line 7—7 of FIG. 6.
Figure 8:
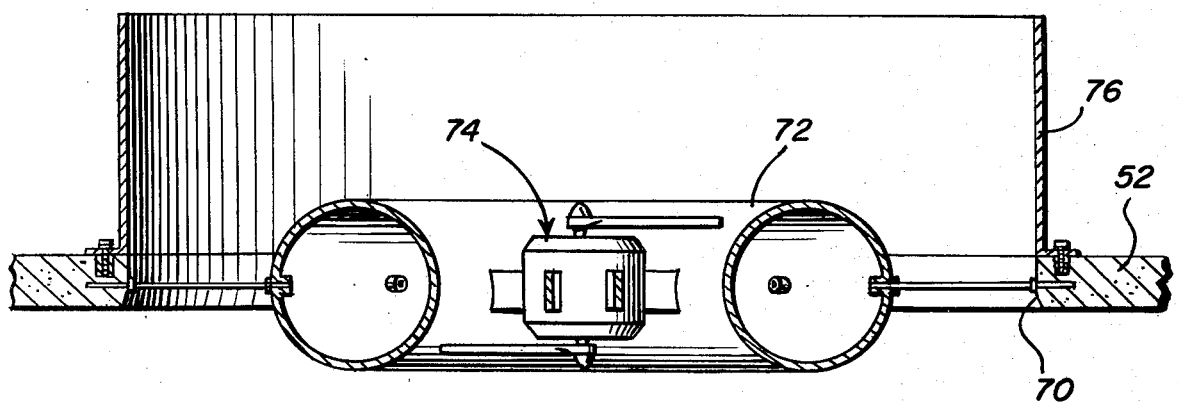
FIG. 8 is an enlarged fragmentary horizontal sectional view taken substantially upon the plane indicated by the section line 8—8 of FIG. 7.

With attention now invited more specifically to FIGS. 6, 7 and 8 of the drawings, it may be seen that the outlet ends of the tubes 12 and 14 open into the outlet plenum assembly 16 and that the latter includes a transverse partition 52 therein dividing the interior of the plenum assembly 16 into an inlet chamber 54 into which the tubes 12 and 14 open and an outlet chamber 56. The outlet chamber 56 opens outwardly through the top portion 58 of the plenum assembly 16 as at 60 and the upper marginal portions of the east and west facing sides 62 and 64 are curved inwardly toward each other as at 66 and 68 whereby either a wind from the east or a wind from the west abutting against the upper marginal portions of the opposite sides 62 and 64 of the inlet plenum assembly 16 will be upwardly deflected for movement across the opening 60 at an accelerated speed, thereby create a partial vacuum within the plenum assembly 16 below the opening 60.

The partition 52 includes three large diameter openings 70 formed therein and three doughnut-type structures 72 are suspended in the openings 70 concentric therewith. Further, double bladed turbine assemblies 74 are mounted within the doughnut-shaped structures 72 and incorporate generators or alternators for generating electrical power. The openings 70 and the shrouds 76 and structures 72 tend to concentrate the air passing through the openings 70 on the turbine assemblies 74 and the output from the generators of the turbine assemblies 74 may be utilized for any suitable purpose.

Each of the openings 70 has a cylindrical shroud 76 operatively associated therewith supported from the inner side of the partition 52 and as air from the tubes 12 and 14 enters the inlet chamber 54 and moves through the openings 70 the central portion of that air is deflected inwardly by the doughnut-shaped structures 72 and through the central portions thereof for acting upon the double bladed turbine assemblies 74.

With attention now invited more specifically to FIGS. 1, 2, 3, 5 and 10 through 12 of the drawings, it may be seen that a pair of small diameter pipes 78 and 80 generally parallel the tubes 12 and 14 and extend therealong in the opposite side channels 82 and 84 defined by the convergent sides of the tubes 12 and 14 on opposite sides of a vertical plane passing through the longitudinal center axes of the tubes. The channel 82 faces the east and the channel 84 faces the west. The lower ends of the pipes 78 and 80 are interconnected by a loop pipe 86 which extends upwardly and over the tube 12 and the lower ends of the pipes 78 and 80 have the upper ends of a pair of small diameter drain pipes 88 and 90 opening thereinto for the purpose of draining condensation in the form of potable water from the lower ends of the pipes 78 and 80, the outlet ends of the drain pipes 88 and 90 may have water weight sensing valves (not shown) operatively associated therewith and may be communicated with any suitable reservoir (not shown) for collecting the condensed water.

The upper ends of the pipes 78 and 80 are interconnected by a second loop pipe 92 which extends upwardly and over the pipe 12 and the upper ends of the pipes 78 and 80 includes branch pipes 94 and 96 which open directly into the inlet chamber 54. The uppermost portion of the loop pipe 92 includes an outlet pipe 98 which opens into the longitudinal midportion of a ram air pipe 100 extending in an east-west direction and including flared opposite ends 102 and 104 opening to the east and west, respectively. The ram air pipe 100 is provided with a flap valve 106 in the central portion thereof into which the outlet pipe 98 opens and the loop pipe 92 is provided with one-way valves 108 and 110 on opposite sides of the central portion thereof into which the inlet end of the outlet pipe 98 opens. Further, the pipes 94 and 96 include one-way valves 112 and 114 intermediate the pipes 78 and 80 and the outlet ends of the pipes 94 and 96 which open into the inlet chamber 54.

Alternately, with attention now directed more specifically to FIG. 11, a modified form of ram air pipe 100' may be used in conjunction with the loop pipe 92 and a pipe 98' corresponding to the pipe 98. However, although the ram air pipe 100' includes a flap valve 106' corresponding to the flap valve 106, a bypass pipe 116 is provided with opposite ends opening into opposite ends of the ram air pipe 100' on opposite sides of the flap valve 106'. The central portion of the bypass pipe 116 includes an inlet pipe 118 opening thereinto from the outlet chamber 56 and the bypass pipe 116 includes one-way valves 120 and 122. The valves 106, 108, 110, 112, 114 and the valve 106' are automatically operated by pressure differential acting thereon and created as a result of wind acting upon the system 10.

Figure 2:
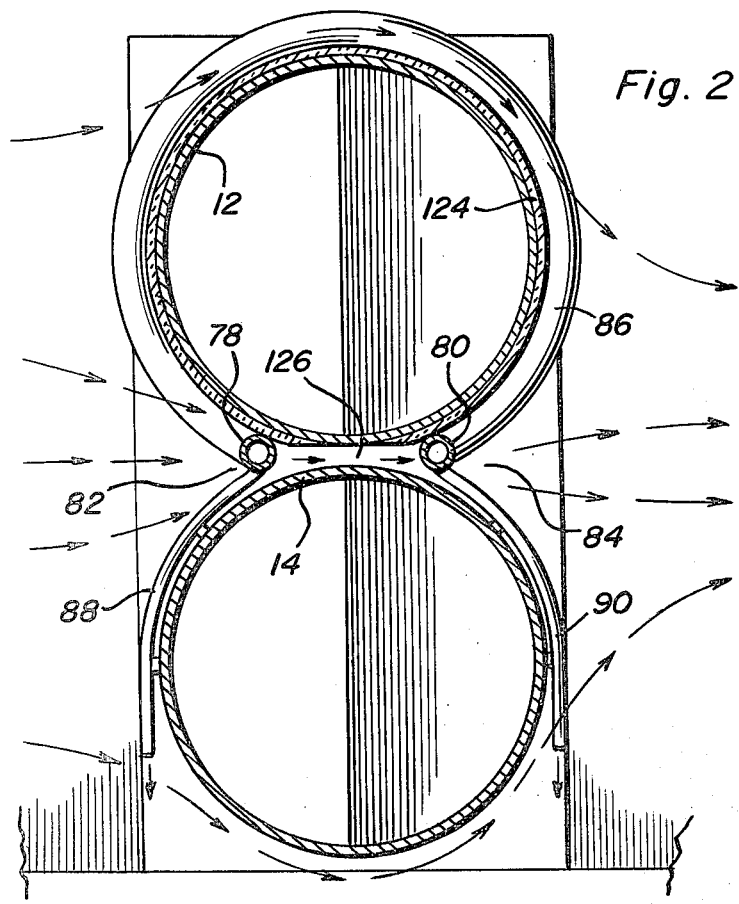
FIG. 2 is an enlarged vertical sectional view taken substantially upon the plane indicated by the section line 2—2 of FIG. 1.

With attention now invited more specifically to FIGS. 2 and 6 of the drawings, it may be seen that the exterior of the tube 12 has a thin coating of black insulation 124 thereover, except on the peripheral portion of the tube 12 which directly opposes the adjacent portion of the tube 14. A narrow throat zone 126 is defined between the tubes 12 and 14 and wind approaching the tubes 12 and 14 from the east is somewhat increased in pressure in the area of the pipe 78, accelerated through the throat zone 126 and decreased in pressure in the area of the pipe 80. Accordingly, the pipe 78 is increased slightly in temperature and the air therein rises in the direction of the arrows 128, see FIG. 10. In addition, the pipe 80 is cooled and the air therein moves in the direction of the arrows 130 and as the air moves to the lower end of the pipe 80, it enters the loop pipe 86 and moves upward and over the tube 12 and into the lower end of the pipe 78 for upward movement therein. Accordingly, the air within the pipe 80 is chilled and a portion of the water content thereof condenses out on the inter walls of the pipe 80 and flows downwardly along the pipe 80 and drains outwardly therefrom through the drain pipe 88. In addition, ram air enters the flared end 102 of the ram air pipe 100 and moves from the ram air pipe 100 through the outlet pipe 98. The ram air then moves into loop pipe 92 and through the one-way valve 108 into pipe 80, pipe 86 and up pipe 78 through pipe 94 and valve 112 and into the inlet chamber 54 of the plenum assembly 16. Thus, the ram air provides the necessary air circulation downward through the pipe 80 and upward through the pipe 78 and into inlet chamber 54. Of course, when the wind blows from the west, the pipe 80 becomes the heated pipe and the pipe 78 becomes the cooled pipe. Also, ram air enters the ram air pipe flared end 104 and moves past the flap valve 106, through the pipe 98 and thereafter through the one-way valve 110 and through pipe 78, pipe 86, pipe 80, pipe 96 and one-way valve 114 into inlet chamber 54.

It is to be noted that the exterior surfaces of the tubes 12 and 14 may be blackened in order to enhance the absorption of solar energy whereby the air within the tubes 12 and 14 will be accelerated upwardly toward the inlet chamber 54.

With attention now invited more specifically to the modified form of ram air pipe 100' illustrated in FIG. 11, ram air entering the flared end 102' of the pipe 100 moves past the flap valve and through the pipe 98 directly into the loop pipe 92 while the flared end 104' of the ram air pipe 100' experiences a reduction in pressure and air is drawn from the outlet chamber 56 through the pipe 118 and into the bypass pipe 116 through the one-way valve 120 therein. In this manner, rather than the ram air pipe 100 providing additional inlet air to the inlet chamber 54, the ram air pipe 100' draws air from the outlet chamber 56 and still effects the same pressure differential on opposite sides of the partition 52, thus increasing the power input to the turbine assemblies 74.

Of course, when the wind acts upon the system 10 from the west, air enters the plenum assembly 18 from the west side thereof.

It may therefore be seen that the system 10 is functional not only to utilize wind power and solar power to generate electricity, but also for the purpose of producing potable water. Further, the system 10 allows solar energy to augment the wind energy utilized thereby. Accordingly, the system 10 is operative to generate reasonable quantities of electrical power and to produce reasonable quantities of potable water with little operating expense. Further, on a cloudy day and at night when there is at least some wind, the system 10 remains in operation. Also, on a sunny day when there is substantially no wind, the system 10 still remains in operation both for the generation of electrical power and for the production of potable water.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wind powered power generating system for use between a pair of spaced large wind channeling structures such as a pair of opposing sides of a canyon or the adjacent sides of a pair of spaced hills, such power generating system including a pair of plenum structures for stationary mounting on said sides, at least one generally horizontal large diameter tube extending between and having its opposite ends opening into said plenum structures, one of said plenum structures including a wind inlet opening formed therein opening horizontally outwardly of one side of said tube for intaking wind air moving toward said one side of said tube, said one plenum structure including wind directing means operative to direct wind air entering said opening into the adjacent end of said tube, the other of said plenum structures including air outlet structure, said plenum structures and said tube together defining a wind air flow passage through said system, wind rotary turbine means disposed in said passage for developing rotary torque responsive to wind flow through said passage, said one plenum structure including opposite side inlet openings and said wind directing means including wind pressure actuated means for inversely opening and closing said opposite side inlet openings.

2. The power generating system of claim 1 wherein said system includes a second generally horizontal tube disposed in superposed slightly spaced relation relative to the first mentioned tube and whose opposite ends also open into corresponding plenum structures.

3. The power generating system of claim 1 wherein said large diameter tube is slightly upwardly inclined toward said other plenum structure.

4. The power generating structure of claim 1 wherein said wind rotary turbine means is disposed in said other plenum structure.

5. The power generating structure of claim 1 wherein said wind rotary turbine means includes structure for funnelling air moving through said passage past said wind rotary turbine means.

6. A wind powered power generating system for use between a pair of spaced large wind channeling structures such as a pair of opposing sides of a canyon or the adjacent sides of a pair of spaced hills, such power generating system including a pair of plenum structures for stationary mounting on said sides, at least one generally horizontal large diameter tube extending between and having its opposite ends opening into said plenum structures, one of said plenum structures including a wind inlet opening formed therein opening horizontally outwardly of one side of said tube for intaking wind air moving toward said one side of said tube, said one plenum structure including wind directing means operative to direct wind air entering said opening into the adjacent end of said tube, the other of said plenum structures including air outlet structure, said plenum structures and said tube together defining a wind air flow passage through said system, wind rotary turbine means disposed in said passage for developing rotary torque responsive to wind flow through said passage, said air outlet structure including wind deflecting means stationary relative to said air outlet structure and operative to accelerate wind incident thereon and moving in a direction transverse to said tube laterally across said air outlet structure.

7. The power generating system of claim 6 wherein said one plenum structure including opposite side inlet openings and said wind directing means includes wind pressure actuated means for inversely opening and closing said opposite side inlet openings.

8. The power generating structure of claim 7 wherein said system includes a second generally horizontal tube disposed in superposed slightly spaced relation relative to the first mentioned tube and whose opposite ends also open into corresponding plenum structures.

9. A wind powered power generating system for use between a pair of spaced large wind channeling structures such as a pair of opposing sides of a canyon or the adjacent sides of a pair of spaced hills, such power generating system including a pair of plenum structures for stationary mounting on said sides, at least one generally horizontal large diameter tube extending between and having its opposite ends opening into said plenum structures, one of said plenum structures including a wind inlet opening formed therein opening horizontally outwardly of one side of said tube for intaking wind air moving toward said one side of said tube, said one plenum structure including wind directing means operative to direct wind air entering said opening into the adjacent end of said tube, the other of said plenum structures including air outlet structure, said plenum structures and said tube together defining a wind air flow passage through said system, wind rotary turbine means disposed in said passage for developing rotary torque responsive to wind flow through said passage, said system including a second generally horizontal tube disposed in superposed slightly spaced relation relative to the first mentioned tube and whose opposite ends also open into correponding plenum structures, said tubes defining convergent surfaces forming a channel on the sides thereof corresponding to said one side of the first mentioned tube, a small diameter pipe extending along and slightly spaced from a full seated position in said channel, means for admitting air into the end of said small diameter pipe adjacent one plenum structure and for discharging air from the other end of said small diameter pipe into the other plenum structure, said large diameter pipe and said small diameter pipe being slightly upwardly inclined toward said other plenum structure.

10. The power generating structure of claim 9 including a second small diameter pipe, said tubes defining convergent surfaces forming a second channel on the sides thereof opposite the first mentioned channel, said second small diameter pipe extending along and only spaced from a full seated position in the second channel, a connecting pipe section communicating the lower ends of said pipes, the lower end of said second pipe including liquid drain means operatively associated therewith.

11. The power generating structure of claim 10 including a second connecting pipe section communicating the upper ends of said pipes, said other plenum structure including incident wind inlet means associated therewith communicated with a mid-length portion of said second connecting pipe section, said second pipe section including oneway check valve means disposed therein on opposite sides of said mid-length portion thereof, the upper ends of said pipes including outlet portions thereof opening into said other plenum structure and equipped with oneway check valves.

12. A wind powered power generating system for use between a pair of spaced large wind channeling structures such as a pair of opposing sides of a canyon or the adjacent sides of a pair of spaced hills, such power generating system including a pair of plenum structures for stationary mounting on said sides, at least one generally horizontal large diameter tube extending between and having its opposite ends opening into said plenum structures, one of said plenum structures including a wind inlet opening formed therein opening horizontally outwardly of one side of said tube for intaking wind air moving toward said one side of said tube, said one plenum structure including wind directing means operative to direct wind air entering said opening into the adjacent end of said tube, the other of said plenum structures including air outlet structure, said plenum structures and said tube together defining a wind air flow passage through said system, wind rotary turbine means disposed in said passage for developing rotary torque responsive to wind flow through said passage, said system including a second generally horizontal tube disposed in superposed slightly spaced relation relative to the first mentioned tube and whose opposite ends also open into corresponding plenum structures, said one plenum structure including opposite side inlet openings, said one plenum structure including opposite side inlet openings and said wind directing means including wind pressure actuated means for inversely opening and closing said opposite side inlet openings, said wind pressure actuated means including a pair of upper and lower damper plates disposed above and below a horizontal baffle plate in said one plenum structure and swingable between opposite limit positions opening and closing said opposite side inlet openings.

13. A wind powered power generating system for use between a pair of spaced large wind channeling structures such as a pair of opposing sides of a canyon or the adjacent sides of a pair of spaced hills, such power generating system including a pair of plenum structures for stationary mounting on said sides, at least one generally horizontal large diameter tube extending between and having its opposite ends opening into said plenum structures, one of said plenum structures including a wind inlet opening formed therein opening horizontally outwardly of one side of said tube for intaking wind air moving toward said one side of said tube, said one plenum structure including wind directing means operative to direct wind air entering said opening into the adjacent end of said tube, the other of said plenum structures including air outlet structure, said plenum structures and said tube together defining a wind air flow passage through said system, wind rotary turbine means disposed in said passage for developing rotary torque responsive to wind flow through said passage, said system including a second generally horizontal tube disposed in superposed slightly spaced relation relative to the first mentioned tube and whose opposite ends also open into corresponding plenum structures, said one plenum structure including opposite side inlet openings, said wind directing means including wind pressure actuated means for inversely opening and closing said opposite side inlet openings, and sets of opposite side freely swingable shutter panels operatively associated with and operable to inversely open and close said opposite side inlet openings responsive to wind incident upon said large diameter pipe from opposite sides thereof.

* * * * *